(12) United States Patent
Chen et al.

(10) Patent No.: US 9,796,170 B2
(45) Date of Patent: Oct. 24, 2017

(54) THREE DIMENSIONAL PRINTING METHOD

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Peng-Yang Chen, New Taipei (TW); Wen-Ten Lin, New Taipei (TW); Chung-Kang Chu, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 488 days.

(21) Appl. No.: 14/458,259

(22) Filed: Aug. 13, 2014

(65) Prior Publication Data

US 2015/0343705 A1   Dec. 3, 2015

(30) Foreign Application Priority Data

Jun. 3, 2014   (TW) .............................. 103119216 A (51) Int. Cl.
*B33Y 80/00* (2015.01)
*B33Y 10/00* (2015.01)
(Continued)

(52) U.S. Cl.
CPC ............ *B33Y 80/00* (2014.12); *B29C 64/106* (2017.08); *B29C 64/112* (2017.08);
(Continued)

(58) Field of Classification Search
CPC ............ B29C 67/0055; B29C 67/0059; B29C 67/0062; B29C 67/0066; B29C 67/007;
(Continued)

(56) References Cited

U.S. PATENT DOCUMENTS 5,248,456 A * 9/1993 Evans, Jr. ............ B29C 67/0066
264/401 X
5,415,820 A    5/1995 Furuta et al.
(Continued)

FOREIGN PATENT DOCUMENTS

CN    102862333    1/2013
CN    103341629    10/2013
(Continued)

OTHER PUBLICATIONS

"Office Action of Taiwan Counterpart Application", dated Mar. 9, 2016, p. 1-p. 4.
(Continued)

*Primary Examiner* — Leo B Tentoni
(74) *Attorney, Agent, or Firm* — JCIPRNET (57) ABSTRACT

A three dimensional structure including a casing and a plurality of filling members is provided. The casing has a first opening. The filling members are disposed inside of the casing for supporting the casing, such that a plurality of hollow portions is defined by the casing and the filling members. The first opening connects between one of the hollow portions and the external environment, and the filling member located between two adjacent hollow portions has at least one second opening for connecting the two adjacent hollow portions. A three dimensional printing method is also provided.

13 Claims, 9 Drawing Sheets

(51) Int. Cl.
   *B29C 64/135* (2017.01)
   *B29C 64/118* (2017.01)
   *B29C 64/124* (2017.01)
   *B29C 64/106* (2017.01)
   *B29C 64/40* (2017.01)
   *B29C 64/112* (2017.01)
   *B29C 64/129* (2017.01)
   *B29C 64/35* (2017.01)

(52) U.S. Cl.
   CPC .......... *B29C 64/118* (2017.08); *B29C 64/124* (2017.08); *B29C 64/129* (2017.08); *B29C 64/135* (2017.08); *B29C 64/35* (2017.08); *B29C 64/40* (2017.08); *B33Y 10/00* (2014.12); *Y10T 428/13* (2015.01)

(58) Field of Classification Search
   CPC . B29C 67/0096; B29C 64/106; B29C 64/112; B29C 64/118; B29C 64/124; B29C 64/129; B29C 64/135; B29C 64/40
   USPC .................................................. 264/308, 401
   See application file for complete search history.

(56) References Cited

U.S. PATENT DOCUMENTS

| | | | |
|---|---|---|---|
| 5,482,659 A * | 1/1996 | Sauerhoefer | B29C 67/0066 264/401 X |
| 5,616,293 A | 4/1997 | Ashtiani-Zarandi et al. | |
| 5,785,919 A * | 7/1998 | Wilson | B29C 67/0066 264/401 X |
| 5,855,718 A | 1/1999 | Nguyen et al. | |
| 5,932,059 A * | 8/1999 | Langer | B29C 67/0051 264/401 X |
| 6,110,602 A | 8/2000 | Dickens et al. | |
| 6,936,212 B1 | 8/2005 | Crawford | |
| 2004/0048027 A1* | 3/2004 | Hayes | B29C 67/0092 428/53 |
| 2005/0129726 A1* | 6/2005 | Liebschner | A61L 27/58 424/423 |

FOREIGN PATENT DOCUMENTS

| | | |
|---|---|---|
| CN | 103608166 | 2/2014 |
| JP | H07-223267 | 8/1995 |
| JP | H09-11341 | 1/1997 |
| JP | 2002-347125 | 12/2002 |
| JP | 2004-130529 | 4/2004 |
| JP | 2009090517 | 4/2009 |
| WO | 2004052637 | 6/2004 |

OTHER PUBLICATIONS

"Office Action of China Counterpart Application," dated Jun. 13, 2017, p. 1-p. 8.

* cited by examiner

THREE DIMENSIONAL PRINTING METHOD

CROSS-REFERENCE TO RELATED APPLICATION

This application claims the priority benefit of Taiwan application serial no. 103119216, filed on Jun. 3, 2014. The entirety of the above-mentioned patent application is hereby incorporated by reference herein and made a part of this specification.

BACKGROUND

1. Technical Field

The disclosure generally relates to a three dimensional structure, and more particularly, to a three dimensional printing method for forming the three dimensional structure.

2. Description of Related Art

As the technology advanced in recent years, many methods that utilize additive manufacturing technology (e.g. layer-by-layer model construction) to build three-dimensional (3D) physical models have been proposed. Typically, the additive manufacturing technology is to convert data of a 3D model, which is constructed by software, such as computer aided design (CAD), into multiple thin (quasi-two-dimensional) cross-sectional layers that are stacked in sequence. In the meantime, many techniques for forming thin cross-sectional layers are also proposed. For example, a printing module of a printing apparatus is usually configured to move above a base along an XY plane according to spatial coordinates XYZ constructed according to the design data of the 3D model, so as to use a construction material to form shapes of the cross-sectional shapes correctly. Then, the deposited construction material may be cured naturally or by heating or light irradiation to form the desired cross-sectional layers. By moving the printing module along the Z axis layer-by-layer, multiple cross-sectional layers can be gradually stacked along the Z axis, and while the construction material is cured layer-by-layer, a 3D object is formed.

Take the technology that forms 3D objects by curing the construction material with a light source as an example, the printing module is configured to be immersed in a liquid modelling material in a container, and a light source module is disposed on the XY plane to irradiate the liquid modelling material, so as to cure and stack the liquid modelling material on a movable platform of the printing module. Accordingly, by moving the movable platform of the printing module layer-by-layer along the Z axis, the liquid modelling material can thus be gradually cured and stacked into a three dimensional structure. Nevertheless, in terms of the completely formed three dimensional structure, in order to reduce the consumption of the modelling material, the three dimensional structure is often designed with structure features, such as a plurality of hollow portions, so as to lower the production costs. However, as a result, after the hollow portions are sealed by the casing, the liquid modelling material is apt to remained in the hollow portions during the forming process, wherein the remained liquid modelling material can easily affect the structure and the stability of the three dimensional structure. Accordingly, how to reduce the material consumption while preventing the liquid modelling material from being remained in the three dimensional structure during the forming process of 3D printing thus become a problem that should be considered and solved by related practitioners.

SUMMARY

The disclosure is directed to a three dimensional structure and a three dimensional printing method configured to enable liquid modelling material to successfully be removed from the inside of the three dimensional structure after the three dimensional structure is formed.

The three dimensional structure of the disclosure includes a casing and a plurality of filling members. The casing has a first opening. The filling members are disposed inside of the casing for supporting the casing. The filling members define a plurality of hollow portions inside the casing. The first opening connects between one of the hollow portions and an external environment, and the filling member located between two adjacent hollow portions has at least one second opening for connecting the two adjacent hollow portions.

The three dimensional printing method of the disclosure is configure to form a three dimensional structure on a platform. The three dimensional printing method includes: constructing a model of a casing of the three dimensional structure; defining a plurality of hollow portions at the internal space of the casing, and using one of the hollow portions as the center so that the rest of the hollow portions surround the center along a radial direction; stacking a modelling material layer-by-layer on the platform to form the casing and a plurality of filling members of the three dimensional structure, wherein the casing seals a portion of the hollow portions. The filling members are located in a portion of the internal space of the casing that is not defined with the hollow portions; and connecting any two adjacent hollow portions.

In view of the foregoing, in the embodiments of the disclosure, the three dimensional structure forms the hollow portions inside the casing thereof and forms the openings on the filling members for connecting the hollow portions; and therefore, during the process of three dimensional printing, even if there is liquid modelling material remaining inside of the hollow portions due to the hollow portions being sealed by the casing, the liquid modelling material can still flow through one of the hollow portions and then flow out of the three dimensional structure through the openings that are connected between the hollow portions and an external environment. Accordingly, the liquid modelling material can be effectively prevented from being left in the completely formed three dimensional structure. And, the three dimensional structure and the three dimensional printing method of the disclosure, in addition to effectively reducing the production cost using the hollow structures inside the casing, can also successfully remove the liquid modelling material from the inside of the three dimensional structure by corresponding the hollow structures with the openings.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
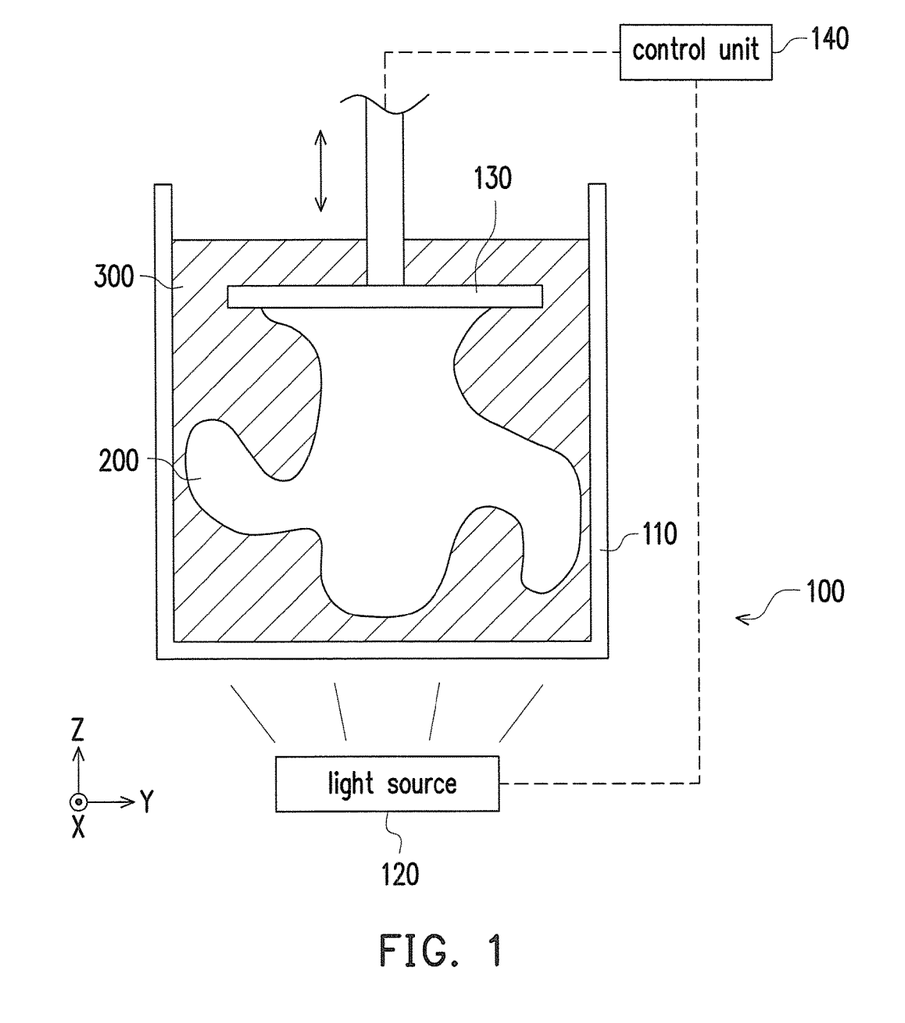
FIG. 1 is a schematic diagram illustrating a three dimensional printing apparatus according to an embodiment of the invention.
Figure 2:
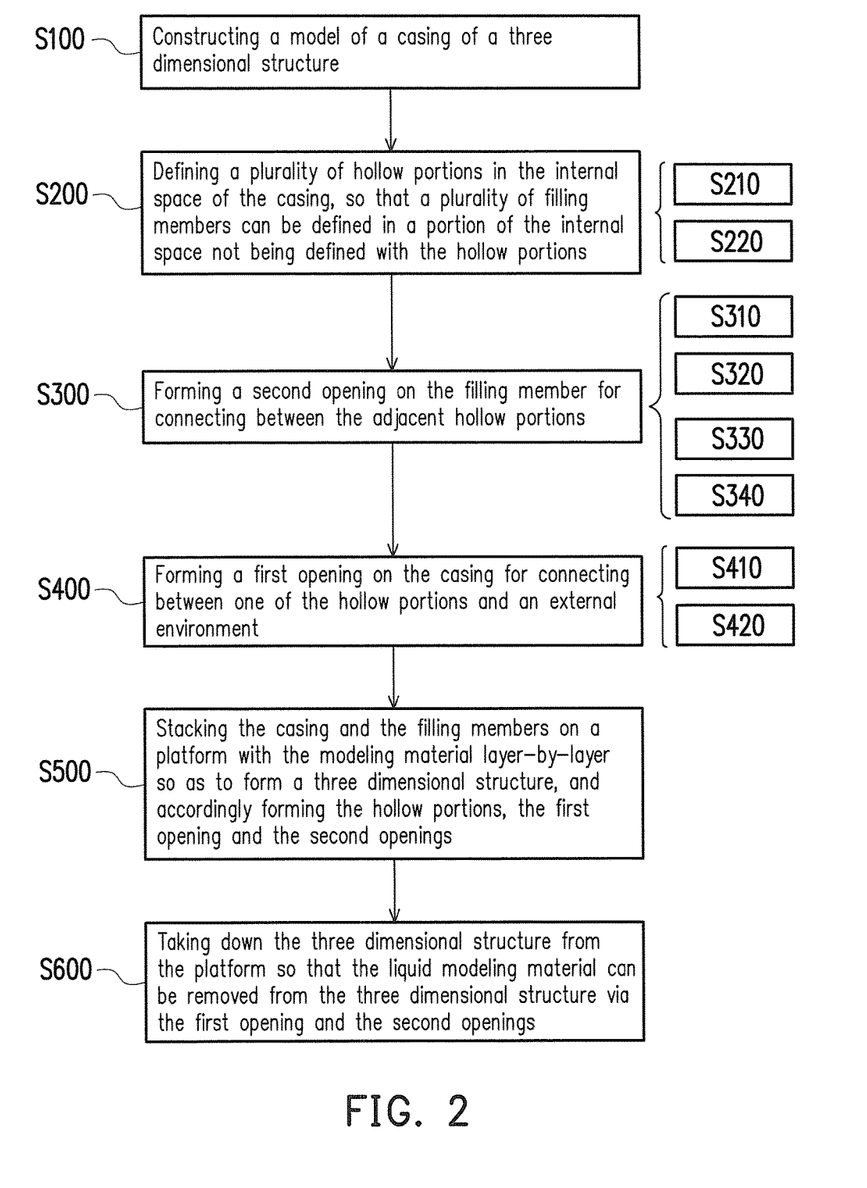
FIG. 2 is a flow chart illustrating a three dimensional printing method according to an embodiment of the invention.
Figure 3:
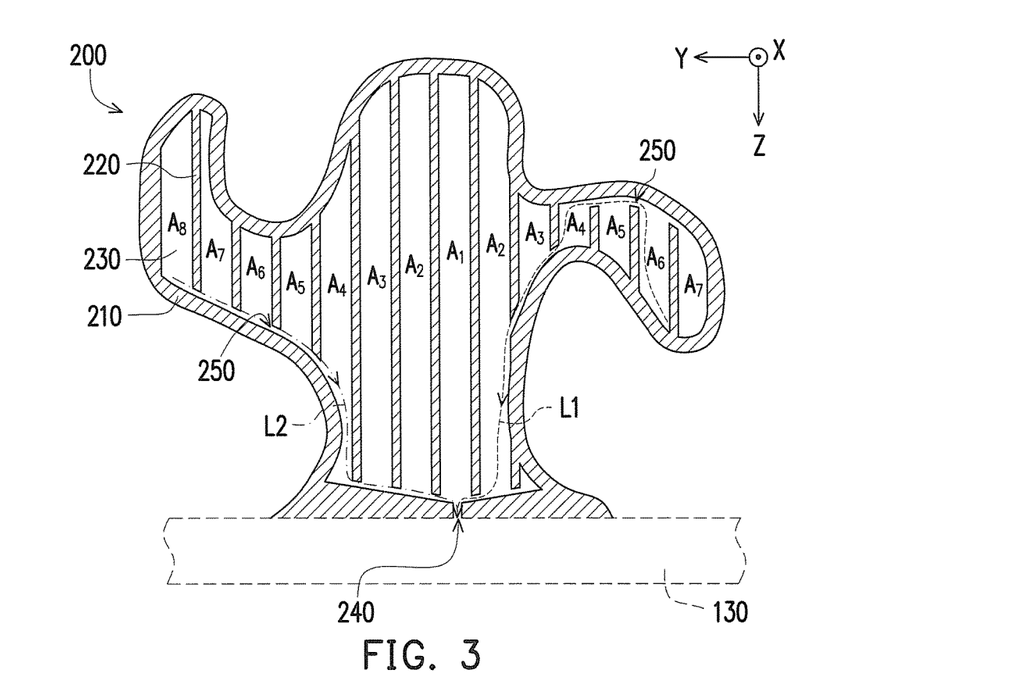
FIG. 3 is a cross-sectional diagram of the three dimensional structure of FIG. 1.

FIG. 1 is a schematic diagram illustrating a three dimensional printing apparatus according to an embodiment of the disclosure. FIG. 2 is a flow chart illustrating a three dimensional printing method according to an embodiment of the disclosure, so that the three dimensional printing apparatus 100 in FIG. 1 can three dimensionally print out a three dimensional structure 200. FIG. 3 is a cross-sectional diagram of the three dimensional structure of FIG. 1, and FIG. 3 demonstrates the three dimensional structure 200 in a state of being taken down from the platform 130 after being formed, and illustrates the platform 130 (in dashed lines) as a reference for determining the location of the three dimensional structure 200. Referring to FIG. 1 through FIG. 3 at the same time, in the present embodiment, the three dimensional printing apparatus 100 is a three dimensional SL (Stereolithography) printing apparatus, which includes a container 110, a light source 120, a platform 130 and a control unit 140, wherein the container 110 is used to contain a liquid modelling material 300, and the platform 130 is controlled by the control unit 140 and is moveably disposed on the container 110 along a Z-axis. Therefore, the platform 130 can move out of the container 110 or move into the container 110 and immerse into the liquid modelling material 300.

In the present embodiment, the light source 120 is disposed below the container 110 so as to penetrate the bottom of the container 110 and irradiate on the liquid modelling material 300. The liquid modelling material 300 is, for example a photosensitive resin, and the light source 120 is configured to provide light within a band (e.g., ultraviolet light) capable of curing the photosensitive resin. Therefore, by using the light provided by the light source 120 to penetrate the container 110 and scanningly irradiate on the liquid modelling material 300 between the platform 130 and the bottom of the container 110, the liquid modelling material 300 may be cured layer-by-layer and be stackingly fixed on the platform 130; and as the platform 130 (along the Z-axis direction) gradually departs from the bottom of the container 110, the three dimensional structure 200 can finally be formed on the platform 130 (namely, the three dimensional structure 200 is formed towards a direction of the negative Z-axis).

Referring to FIG. 2 and FIG. 3, as previously described, the present embodiment is to convert and transfer the design data of a 3D model constructed by computer-aided design to the three dimensional printing apparatus 100 so as to form the three dimensional structure 200, and thus the following steps are to define the relevant structures in the design stage of the 3D model. Firstly, in step S100, the model of a casing 210 of the three dimensional structure 200 is constructed to determine the contour of the three dimensional structure 200. Next, in step S200, a plurality of hollow portions 230 is further defined in the internal space of the casing 210, and thus a plurality of filling members 220 can be defined in a portion of the internal space not being defined with the hollow portions 230, wherein the hollow portions 230 and the filling members 220 are all extending along the normal direction of the platform 130 (namely, the Z-axis direction shown in FIG. 3), such that an extending direction of the hollow portions 230 is the same as a three dimensional printing direction of the filling members 220. Next, in step S300, a second opening 250 is formed on each respective filling member 220, so that the second opening 250 connects between the adjacent hollow portions 230. In step S400, a first opening 240 is formed on the casing 210, so that the first opening 240 connects between one of the hollow portions 230 and an external environment. It is to be noted that, the order for performing step S300 and step S400 of the present embodiment is not limited, namely, no matter in the stage of model design or the subsequent stage of actual printing, it does not matter which of the first opening 240 and the second opening 250 comes first or after.

Accordingly, the 3D model constructed in the design stage of the three dimensional structure 200 is thereby completed. Next, in step S500, data of the 3D model is converted and transferred to the three dimensional printing apparatus 100, and by further using the control unit 140 to control the platform 130 and the light source 120, the light provided by the light source 120 is able to scan and cure the liquid modelling material 300 layer-by-layer according to the data of the 3D model, so as to stack the actual parts of the casing 210 and the filling members 220 layer-by-layer on the platform 130 and simultaneously form the hollow portions 230, first opening 240 and the second opening 250.

As described previously, during the three dimensional printing process of the three dimensional structure 200, the liquid modelling material 300 may be sealed in the hollow portions 230 due to the hollow portions 230 being sealed by the casing 210, but with the presence of the first opening 240 and the second openings 250, the liquid modelling material 300 thus can flow within the internal space of the casing 210. Therefore, in step S600 of the present embodiment, after a user remove the three dimensional structure 200 from the platform 130, the liquid modelling material 300 in the hollow portions 230 can be guided to one of the hollow portions 230 through the second openings 250, and then the liquid modelling material 300 can successfully be removed from the three dimensional structure 200 via the first opening 240 on the casing 210.

Herein, the hollow portions 230 in FIG. 3 are marked as $A_1, A_2, A_3 \ldots A_8$ in order to facilitate the subsequent illustration. In detail, referring to FIG. 1 and FIG. 3 at the same time, it is very clear that before and after the formation, the three dimensional structure 200 of FIG. 1 as compared to that of FIG. 3 is in an inverted state, namely, the three dimensional structure 200 is being placed upside down after being taken down from the platform 130, and thus a side of the three dimensional structure 200 originally attached to the platform 130 then becomes the base of the structure. As a result, the first opening 240 of the present embodiment that is located at this side can also achieve effects of removing the liquid modelling material 300 out of the hollow portions 230 under a condition not influencing the appearance. Nevertheless, the present embodiment is not intended to limit the location and the number of the first opening 240 on the casing 210, such that appropriate adjustments can be made by a designer according to the appearance of the three dimensional structure 200. In terms of the present embodiment, the first opening 240 can be used to connect between the hollow portion ($A_1$) and the external environment, whereas the first opening 240 can also be used to connected between the other hollow portion ($A_2$, $A_3$ ... or $A_8$) and the external environment.

Similarly, the present embodiment is also not intended to limit the configuration of the second openings 250. In further detail, the second openings 250 still have to be appropriately adjusted in correspondence to the structure characteristics of the three dimensional structure 200. For instance, in the state as shown in FIG. 1 (namely, equivalent to viewing the three dimensional structure 200 of FIG. 3 upside down), the right side of the three dimensional structure 200 is presented as a baggy structure (a portion of the structure shown in FIG. 3 that includes the hollow portions $A_7$ and $A_8$), and thus the liquid modelling material 300 would be sealed within the hollow portions $A_7$ and $A_8$ during the forming process is unable to be removed. Nevertheless, once the three dimensional printing is completed and after the three dimensional structure 200 is taken down from the platform 130, the three dimensional structure 200 would be inverted into the state shown in FIG. 3. Now, the liquid modelling material 300 located within the hollow portions $A_7$ and $A_8$ thus can be guided along the second openings 250 and flow to the hollow portion $A_1$ so as to be removed via the first opening 240, as demonstrated by a path L2 shown in FIG. 3.

Similarly, in FIG. 1, the liquid modelling material 300 at the left side of the three dimensional structure 200 is not presented with a structure similar to that of the right side, and thus the liquid modelling material 300 within the hollow portions $A_5$-$A_7$ can instantly flow to the hollow portion $A_4$ along the second opening 250 during the forming process, and then after the three dimensional structure 200 is being taken down and inverted into the state as shown in FIG. 3, the liquid modelling material 300 within the hollow portion $A_4$ can continue to flow to the hollow portion $A_1$ along the second opening 250, and be removed via the first opening 240, as demonstrated by a path L1 shown in FIG. 3.

In view of the above, the second opening 250 of the present embodiment can be disposed in at least one end of the hollow portions 230 along the Z-axis with respect to the corresponding relationship between the hollow portions 230, so that in step S600, the user can achieve the effect of removing the liquid modelling material 300 out of the three dimensional structure 200 by mean of disposing the three dimensional structure 200 upside down for at least once.

Figure 4:
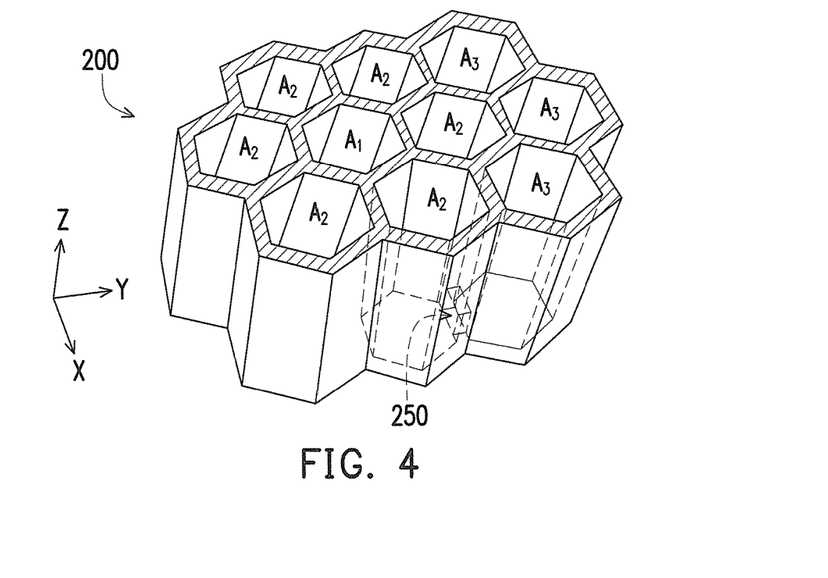
FIG. 4 is a partial cross-sectional diagram illustrating the three dimensional structure of FIG. 3 in a three dimensional perspective.

FIG. 4 is a partial cross-sectional diagram illustrating the three dimensional structure of FIG. 3 in a three dimensional perspective. Referring to FIG. 2 through FIG. 4 at the same time, the method for defining the hollow portions 230 is further described in step S200. That is, by using one of the hollow portions (i.e., $A_1$) as the center, the rest of the hollow portions $A_2$, $A_3$ ... surround the hollow portion $A_1$ along a radial direction (viz., an emission line direction on the X-Y plane with the center being hollow portion $A_1$) by means of multi-layering, and thus the hollow portions 230 appear to be in a honeycomb-like arrangement and the cross-sections thereof have the same size. As shown in FIG. 4, apart from the hollow portion $A_1$ at the center, the hollow portions 230 which are located on a same layer are marked the same. As such, the hollow portions 230 of the present embodiment can appear to be a hexagonal columnar structure, and are accordingly arranged layer-by-layer. FIG. 3 may be considered as the cross-sectional diagram along the radial direction while using the hollow portion $A_1$ as the center. At the same time, the hollow portions 230 can attain the densest configuration with the honeycomb structure thereof, and thus the three dimensional structure 200 can also have a more favorable structural strength.

In other words, in the present embodiment, the arrangement of the hollow portions 230 forms a multi-layered configuration in sequence $\{A_n\}$ in the radial direction that uses the normal direction of the platform 130 as the center, wherein n is a positive integer and represents a layer number of the honeycomb, and the hollow portion 230 being the center is marked as $A_1$.

Figure 5:
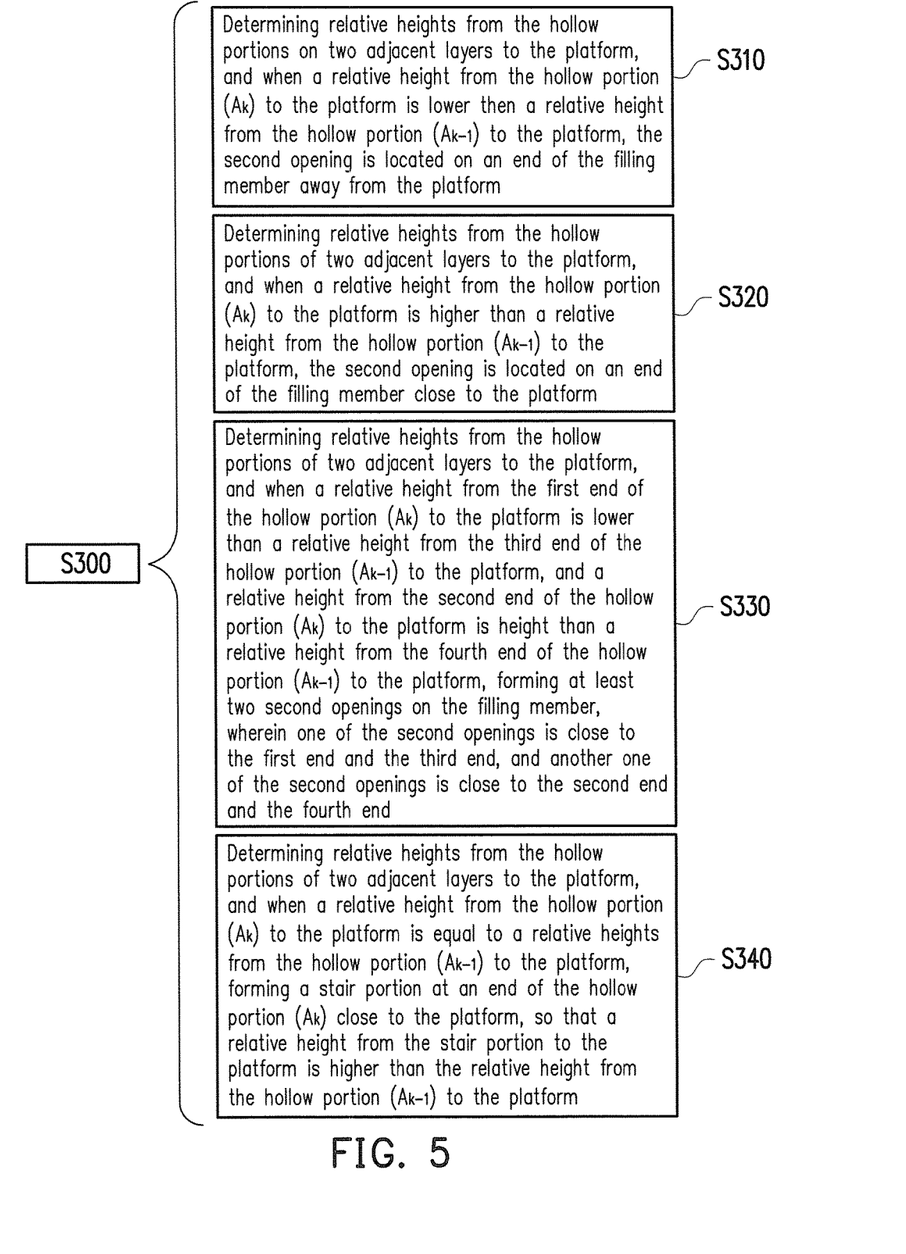
FIG. 5 illustrates the detailed process of step S300.

FIG. 5 illustrates the detailed process of step S300. FIG. 6 to FIG. 9 are partial equivalent schematic diagrams respectively illustrating the hollow portions of FIG. 3 hollow portions, and are provided for describing the formation of the second openings 250. Referring to FIG. 5 and FIG. 6 through FIG. 9, several different steps are respectively provided herein so as to further describe the corresponding relationship between the second openings 250 and the hollow portions 230 in step S300.

Figure 6:
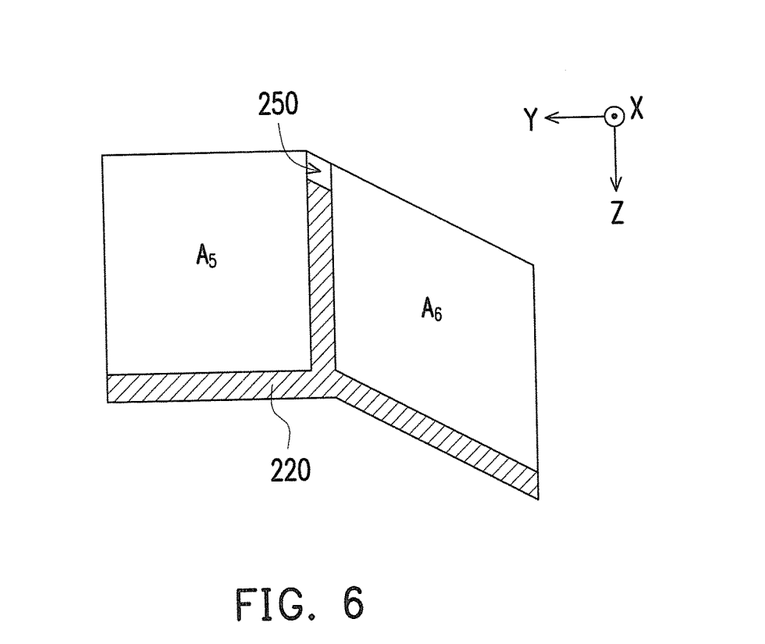
FIG. 6 to FIG. 9 are partial equivalent schematic diagrams respectively illustrating the hollow portions of FIG. 3 hollow portions.

In step S310, referring to FIG. 3 and FIG. 6 at the same time, relative heights from the hollow portions 230 on two adjacent layers to the platform 130 are respectively determined. When a relative height from the hollow portion ($A_k$) to the platform 130 is lower then a relative height from the hollow portion ($A_{k-1}$) to the platform 130, the second opening 250 is located on an end of the filling member 220 away from the platform 130, wherein k is a positive integer greater than 1. Herein, taking the hollow portions $A_5$ and $A_6$ of the three dimensional structure 200 at the right side of FIG. 3 as an example, since it is described previously that the states of the three dimensional structure 200 in FIG. 3 and FIG. 1 are the inversion of each other, and the hollow portion $A_6$ at the right side of FIG. 3 is closer to the platform 130 than the hollow portion $A_5$, the hollow portion $A_5$ would be sealed by the casing 210 later than the hollow portion $A_6$ during the for ring process. Therefore, according to step S310, the second opening 250 is to be disposed at an end of the hollow portion 230 away from the platform 130 and along the Z-axis, so that the liquid modelling material 300 may substantially be guided to the hollow portion $A_4$ when the hollow portion $A_5$ is sealed. Accordingly, it can be inferred that one of the design logics of the second opening 250 is: in terms of the hollow portion $A_1$ located at the center, for the hollow portions 230 in the two adjacent layers, when a relative distance from the hollow portion ($A_k$) of the outer layer to the platform 130 is less than a relative distance from the hollow portion ($A_{k-1}$) of the inner layer to the platform 130, then the second opening 250 is required to be designed at the end of the hollow portion 230 away from the platform 130.

Figure 7:
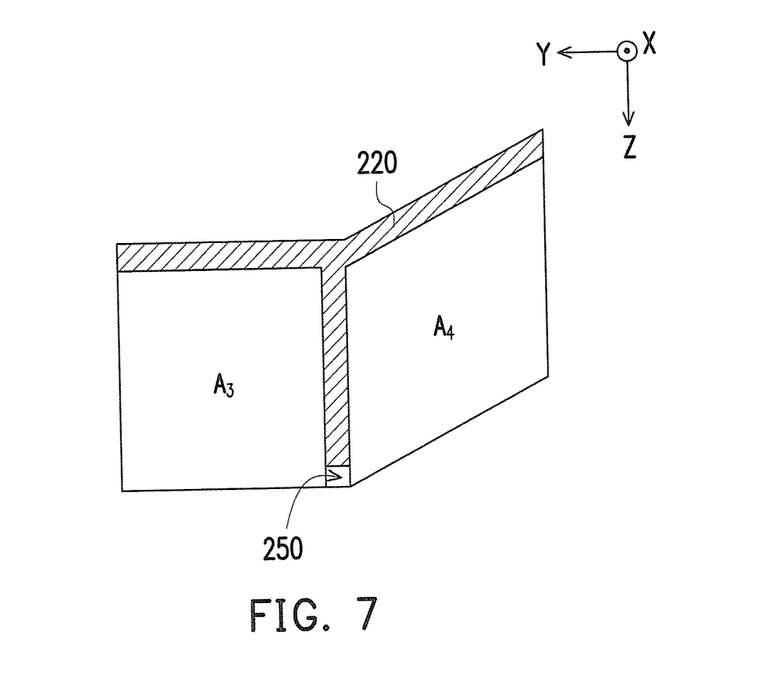

Furthermore, in step S320, comparing FIG. 3 with FIG. 7, relative heights from the hollow portions 230 of two adjacent layers to the platform 130 are respectively determined, and when a relative height from the hollow portion ($A_k$) to the platform 130 is higher than a relative height from the hollow portion ($A_{k-1}$) to the platform 130, the second opening 250 is located on an end of the filling member 220 close to the platform 130, wherein k is a positive integer greater than 1. Herein, taking the hollow portions $A_3$ and $A_4$ of the three dimensional structure 200 at the right side of FIG. 3 as an example, since the hollow portion $A_3$ is closer to the platform 130 than the hollow portion $A_4$, it indicates that the hollow portion $A_4$ would sealed by the casing 210 later than the hollow portion $A_3$ during the forming process. Therefore, according to the step S320, the second opening 250 is required to be disposed at an end of the hollow portion 230 close to the platform 130 and along the Z-axis. Hence, even though the liquid modelling material 300 is unable to flow towards the hollow portion 230 at the center of the three dimensional structure 200 successfully during the forming process, but when the three dimensional printing is completed and the three dimensional structure 200 is inverted into a state as shown in FIG. 3, the liquid modelling material 300 can then successfully flow from the hollow portion $A_4$ to the hollow portion $A_3$. Accordingly, it can be inferred that another one of the design logics of second opening 250 is: in terms of the hollow portion $A_1$ located at the center, for the hollow portions 230 in the two adjacent layers, when a relative distance from the hollow portion $(A_k)$ of the outer layer to the platform 130 is greater than a relative distance from the hollow portion $(A_{k-1})$ of the inner layer to the platform 130, then the second opening 250 is required to be designed at the end of the hollow portion 230 close to the platform 130.

Figure 8:
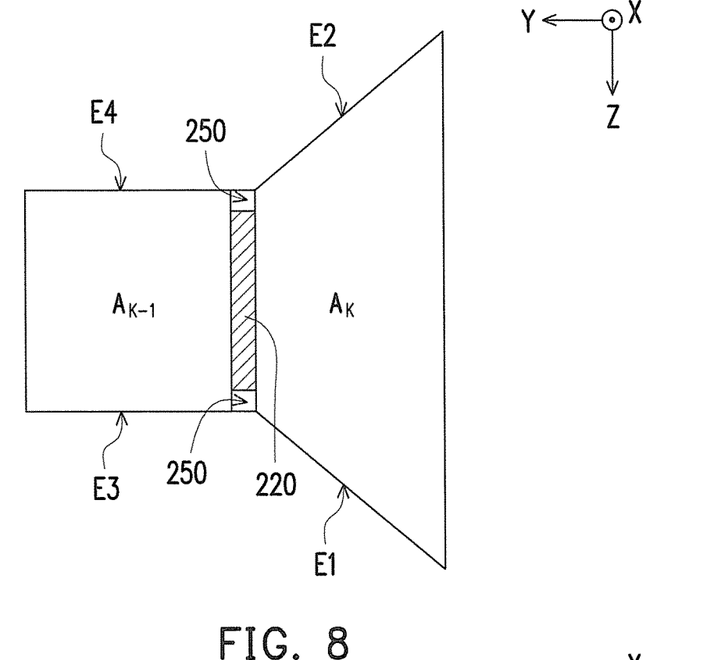

In addition, referring to FIG. 8, it is a schematic configuration diagram of the hollow portions according to another embodiment, wherein in terms of the hollow portion $A_1$ located at the center, the hollow portion $(A_k)$ is considered as the outer layer, and the hollow portion $(A_{k-1})$ is considered as the inner layer. In step S330 of the present embodiment, the hollow portion $(A_k)$ has a first end E1 and a second end E2 opposite to each other, and the first end E1 is close to the platform 130 while the second end E2 is away from the platform 130. The hollow portion $(A_{k-1})$ has a third end E3 and a fourth end E4 opposite to each other, and the third end E3 is close to the platform 130 while the fourth end E4 is away from the platform 130. Similarly, relative heights from the hollow portions 230 of two adjacent layers to the platform 130 are respective determined, and when a relative height from the first end E1 of the hollow portion $(A_k)$ to the platform 130 is lower than a relative height from the third end E3 of the hollow portion $(A_{k-1})$ to the platform 130, and a relative height from the second end E2 of the hollow portion $(A_k)$ to the platform 130 is height than a relative height from the fourth end E4 of the hollow portion $(A_{k-1})$ to the platform 130, at least two second openings 250 are to be formed on the filling member 220, wherein one of the second openings 250 is close to the first end E1 and the third end E3, and another one of the second openings 250 is close to the second end E2 and the fourth end E4.

Accordingly, it can be inferred that another one of the design logics of second opening 250 is: in terms of the hollow portion $A_1$ located at the center, for the hollow portions 230 in the two adjacent layers, when a relative distance from the bottom of the hollow portion $(A_k)$ of the outer layer to the platform 130 is less than a relative distance from the bottom of the hollow portion $(A_{k-1})$ of the inner layer to the platform 130, and a relative distance from the top of the hollow portion $(A_k)$ of the outer layer to the platform 130 is greater than a relative distance from the top of the hollow portion $(A_{k-1})$ of the inner layer to the platform 130, then the second openings 250 are required to be designed at both ends, opposite to each other, of the hollow portions 230 along the Z-axis. In other words, the above method enables the liquid modelling material 300 to circulate between the hollow portions 230 after the three dimensional structure 200 is formed, regardless whether the three dimensional structure 200 is in the upright or inverted state.

Figure 9:
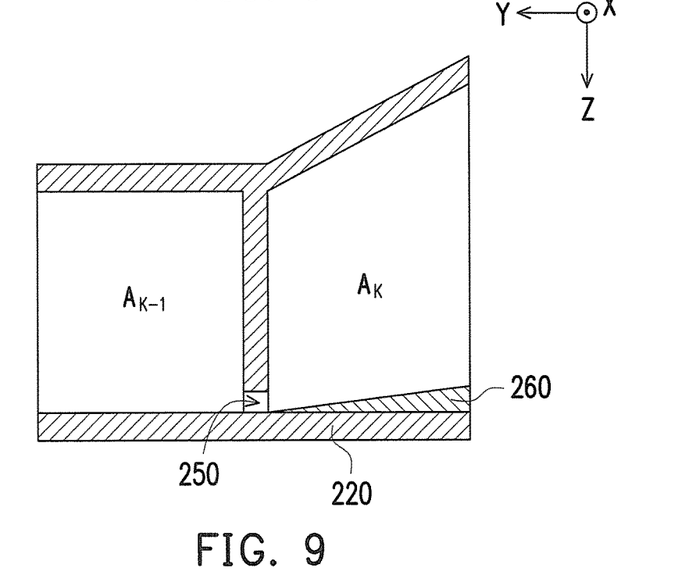

On the other hands, referring to FIG. 9, it is a schematic configuration diagram of the hollow portions according to another embodiment. In step S340 of the present embodiment, relative heights from the hollow portions 230 of two adjacent layers to the platform 130 are respectively determined, and when a relative height from the hollow portion $(A_k)$ to the platform 130 is equal to a relative heights from the hollow portion $(A_{k-1})$ to the platform 130, a stair portion is formed at an end of the hollow portion $(A_k)$ close to the platform 130, such that a relative height from the stair portion 260 to the platform 130 is higher than the relative height from the hollow portion $(A_{k-1})$ to the platform 130, and the stair portion 260 is substantially titled towards the hollow portion $(A_{k-1})$ in order to guide the liquid modelling material 300. In other words, the present embodiment, with the configuration of the stair portion 260, enables the hollow portion $(A_k)$ of the outer layer to be higher than the hollow portion $(A_{k-1})$ of the inner layer so as to ensure that the liquid modelling material 300 can successfully flow from the outer layer towards the inner layer. Accordingly, it can be inferred that the steps S310 to S340 of the present embodiment are to make two hollow portions 230 adjacent to each other to have different heights relative to the platform 130, such that the relative distance from one of the hollow portions 230 to the platform 130 is not equal to the relative height from another one of the hollow portions 230 to the platform 130, wherein the difference between the heights of the two structures ensures that the liquid modelling material 300 can successfully flow within the two structures.

Figure 10:
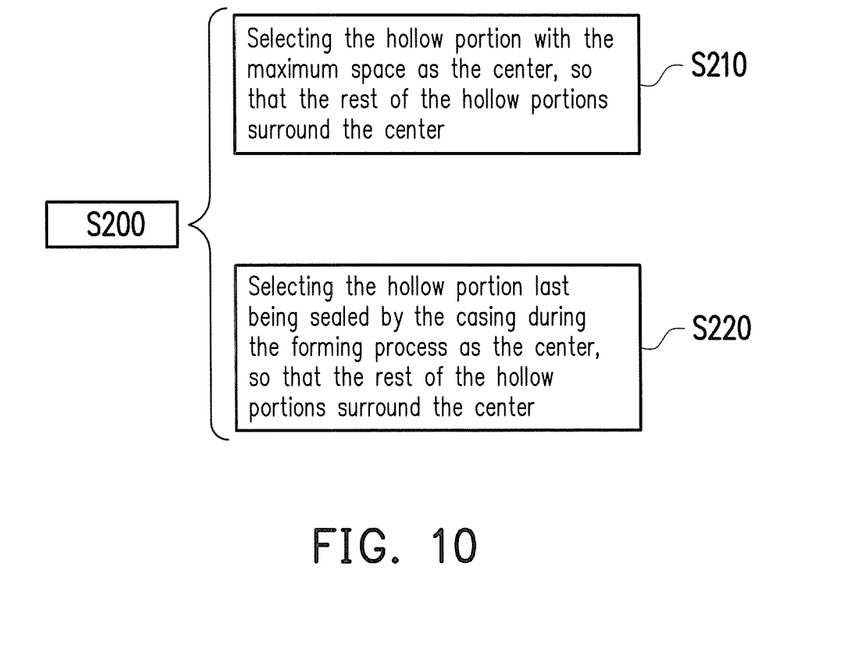
FIG. 10 illustrates the detailed process of step S200 in the flow chart of FIG. 2.
Figure 11:
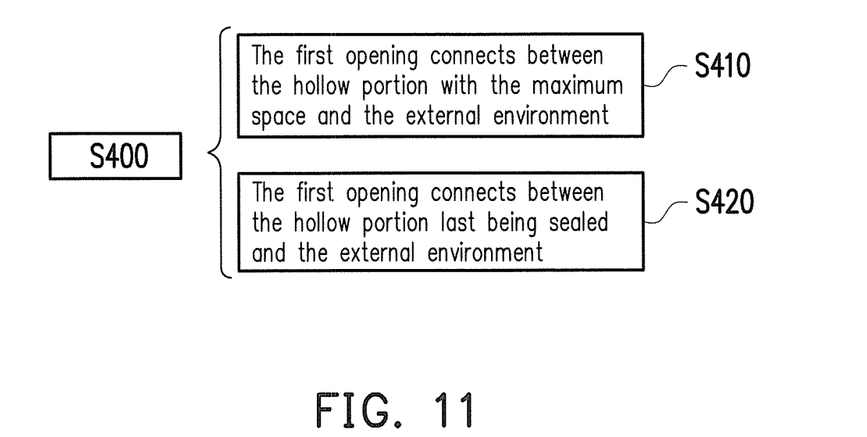
FIG. 11 illustrates the detailed process of step S400 in the flow chart of FIG. 2.

In addition, the configurations of the second opening 250 as described above are all provided to ensure that the liquid modelling material 300 can successfully flow between the hollow portions 230 (regardless of during the forming process or when the three dimensional structure is being disposed upside down for at least one after being formed), and thus the first opening 240 can correspondingly be disposed on the casing 210 according to the needs, so as to enable the hollow portions 230 to connect with the external environment, and thereby simultaneously allows the liquid modelling material 300 to be removed from the three dimensional structure 200 via the first opening 240 while flowing between the hollow portions 230. FIG. 10 illustrates the detailed process of step S200 in the flow chart of FIG. 2. FIG. 11 illustrates the detailed process of step S400 in the flow chart of FIG. 2. Referring to FIG. 10, FIG. 11 and FIG. 3, generally, in the present embodiment, the method for defining the first opening 240 in described in step S200 includes: in step S210, selecting the hollow portion 230 with the maximum space as the center, so that in step S410, the first opening 240 is formed to connect between the hollow portion 230 with the maximum space and the external environment; or also in step S220, selecting the hollow portion 230 last being sealed by the casing 20 during the forming process as the center, so that in step S420, the first opening 240 is formed to connect between the hollow portion 230 last being sealed and the external environment.

In detail, please refer to FIG. 3, in step S210, since the cross-sections (viz., the X-Y plane) of the hollow portions 230 appearing to be the column shaped honeycomb structure have the same size, space sizes of the hollow portions 230 are substantially depend on extending lengths of the hollow portions 230. Therefore, when defining the hollow portions 230 in step S210, the hollow portion $A_1$ with the maximum space is selected as the center of the multi-layered structure, and then during step S410, the first opening 240 is disposed at a location of the casing 210 that can be connected with the hollow portion $A_1$. In other words, step S210 may be considered as to separate the three dimensional structure 200 into a plurality of columnar units with the same cross-section, and the columnar unit with the maximum volume is configured to be the hollow portion $A_1$, such that the hollow portion $A_1$ can be used as a reference for disposing the first opening 240 in step S410. Furthermore, the hollow portion $A_1$ with a larger space also indicates that more liquid modelling material 300 can be accommodated, and thus is conducive in being a confluence for the liquid modelling material 300 during the forming process, such that the liquid modelling material 300 from the rest of the hollow portions 230 can all be guided to the hollow portion $A_1$.

Nevertheless, the spaces of the hollow portions 230 may also be altered along with the appearance of the three dimensional structure 200, and thus in step S220, the hollow portion $A_1$ last being sealed by the casing 120 during the forming process is selected as the center, and then in step S420, the first opening 240 is disposed at the hollow portion $A_1$ last being sealed, so that the liquid modelling material 300 at the confluence can successfully be removed.

In view of the above, steps S310 through S340 of the invention provide the determination means for designing the second opening 250, and step S210 or 220 and the corresponding step S410 or step S420 can determine the location of the first opening 240 after determined which of the hollow portions 230 is to be used as the center. Accordingly, the three dimensional structure 200, and the hollow portions 230 and the filling members 220 within the three dimensional structure 200, can thus be completely defined, thereby forming a complete 3D model. Nevertheless, the designer may still modify the appearance, the size and the number of the hollow portions 230, as well as their arrangement within the internal space, according to the practical requirements, the structure appearance, the material and so forth.

Figure 12:
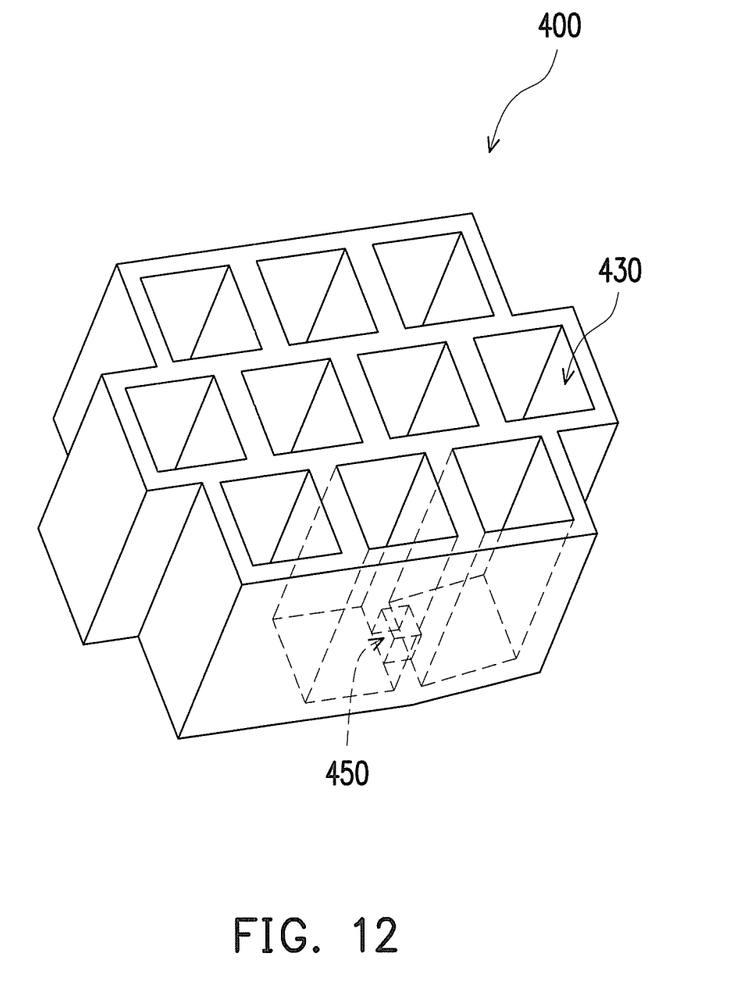
FIG. 12 and FIG. 13 are three dimensional cross-sectional diagrams respectively illustrating a three dimensional structure according to different embodiments.
Figure 13:
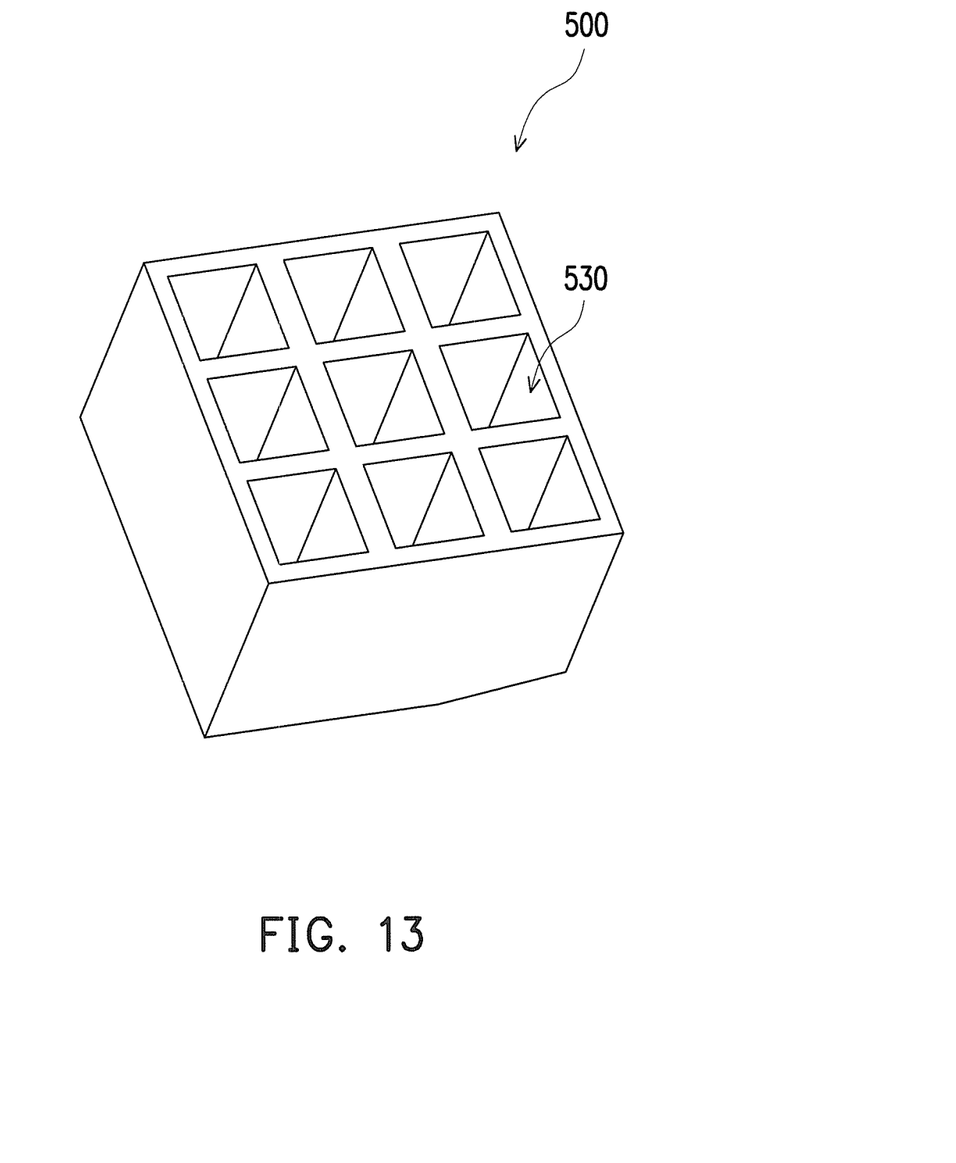

FIG. 12 and FIG. 13 are three dimensional cross-sectional diagrams respectively illustrating a three dimensional structure according to different embodiments. Referring to FIG. 12 and FIG. 13 respectively, as different from the previously mentioned embodiments, hollow portions 430 of the three dimensional structure 400 and the hollow portions 530 of the three dimensional structure 500 are all respectively appear to be collective structures of tetragonal column shape, and the three dimensional structure 400 is similar to the three dimensional structure 200 of FIG. 4 in a way that, the three dimensional structure 400 also attains the effect of enabling the liquid modelling material 300 to flow between the hollow portions 430 through using the second openings 450. And, an only difference is provided that, the hollow portions 530 of the three dimensional structure 500 are appeared to be in a matrix arrangement, while the hollow portions 430 of the three dimensional structure 400 are appeared to be in a staggered arrangement such that the hollow portions 430 in adjacent rows (or columns) are partially staggered with each other. Accordingly, the designer may appropriately adjust the cross-sectional profiles and the arrangement of the hollow portions according to the appearance of the three dimensional structure.

In summary, in the above embodiments of the invention, with the filling members and the hollow portions being disposed inside of the casing of the three dimensional structure, the liquid modelling material being sealed within the three dimensional structure during three dimensional printing process can flow between the hollow portions through the second opening and then can be removed from the three dimensional structure via the first opening after flowing together, thereby effectively solving the problem of liquid modelling material residue.

In further detail, when designing the 3D model of the three dimensional structure, the above-mentioned effects are achieved by configuring structures such as the hollow portions, the first opening, the second opening and so forth, wherein the hollow portion with the maximum space or last being sealed during the forming process is the center, while the rest of the hollow portions layer-by-layer surround the center, so that the location of the first opening can accordingly be determined while the multi-layered collective structure is being formed. Furthermore, the location of the second opening can be determined through determining the difference between the relative heights from the hollow portions of two adjacent layers to the platform. Accordingly, the hollow portions of the collective structure as described in above, in addition to effectively reduce the consumption of the filling material, can also enhance the structural strength of the three dimensional structure, and most importantly, can enable the liquid modelling material to successfully be removed from the three dimensional structure.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A three dimensional printing method, configured to form a three dimensional structure on a platform, the three dimensional printing method comprising:
   constructing a model of a casing of the three dimensional structure;
   defining a plurality of hollow portions at the internal space of the casing, and using one of the hollow portions as a center so that the rest of the hollow portions surround the center along a radial direction;
   stacking a modelling material layer-by-layer on the platform to form the casing and a plurality of filling members of the three dimensional structure, wherein the casing seals a portion of the hollow portions, and the filling members are located in a portion of the internal space of the casing that is not defined with the hollow portions; and
   connecting any two adjacent hollow portions,
   wherein in the radial direction using the normal direction of the platform as the center, the hollow portions are marked as multi-layered configuration in sequence $\{A_n\}$, n is a positive integer, the hollow portion being the center is $(A_1)$, and the three dimensional printing method further comprises:
   forming at least one first opening in the casing, the first opening connecting between at least one of the hollow portions and an external environment; and
   determining relative heights from the hollow portions of two adjacent layers to the platform, and forming at least one second opening on the filling member between the hollow portions of the two adjacent layers, so that the second opening connects between the hollow portions of the two adjacent layers.

2. The three dimensional printing method as recited in claim 1, wherein the hollow portions respectively extend along the normal direction of the platform so as to form a column shaped honeycomb structure.

3. The three dimensional printing method as recited in claim 1, wherein the hollow portions extend along the normal direction of the platform so as to form a tetragonal columnar structure.

4. The three dimensional printing method as recited in claim 1, wherein the first opening connects between the hollow portion $(A_1)$ and the external environment.

5. The three dimensional printing method as recited in claim 1, wherein the at least one first opening connects between one of the rest hollow portions not being the hollow portion ($A_1$) and the external environment.

6. The three dimensional printing method as recited in claim 1 being a three dimensional SL printing method and comprising:
after the casing and the filling members are formed, the uncured liquid modelling material flowing to at least one of the hollow portions through the second openings and then flowing out of the three dimensional structure via the first opening.

7. The three dimensional printing method as recited in claim 1 further comprising:
after the casing and the filling members are formed, placing the three dimensional structure upside down so that the uncured liquid modelling material flows to at least one of the hollow portions through the second openings and then flows out of the three dimensional structure via the first opening.

8. The three dimensional printing method as recited in claim 1 further comprising:
when a relative height from the hollow portion ($A_k$) to the platform is lower than a relative height from the hollow portion ($A_{k-1}$) to the platform, the second opening being located on an end of the filling member away from the platform, wherein k is a positive integer greater than 1.

9. The three dimensional printing method as recited in claim 1 further comprising:
when a relative height from the hollow portion ($A_k$) to the platform is higher than a relative height from the hollow portion ($A_{k-1}$) to the platform, the second opening being located on an end of the filling member close to the platform, wherein k is a positive integer greater than 1.

10. The three dimensional printing method as recited in claim 1, wherein the hollow portion ($A_k$) has a first end and a second end opposite to each other, the first end is close to the platform, the second end is away from the platform, the hollow portion ($A_{k-1}$) has a third end and a fourth end opposite to each other, the third end is close to the platform, the fourth end is away from the platform, and the three dimensional printing method further comprises:
when a relative height from the first end of the hollow portion ($A_k$) to the platform is lower than a relative height from the third end of the hollow portion ($A_{k-1}$) to the platform, and a relative height from the second end of the hollow portion ($A_k$) to the platform is higher than a relative height from the fourth end of the hollow portion ($A_{k-1}$) to the platform, forming at east two second openings on the filling member, wherein one of the second openings is close to the first end and the third end, and the another one of the second openings is close to the second end and the fourth end.

11. The three dimensional printing method as recited in claim 1 further comprising:
when a relative height from the hollow portion ($A_k$) to the platform is equal to a relative height from the hollow portion ($A_{k-1}$) to the platform, forming a stair portion at an end of the hollow portion ($A_k$) close to the platform so that a relative height from the stair portion to the platform is higher than the relative height from the hollow portion ($A_{k-1}$) to the platform.

12. The three dimensional printing method as recited in claim 4 further comprising:
selecting the hollow portion with the maximum space as the center.

13. The three dimensional printing method as recited in claim 4 further comprising:
selecting the hollow portion last being sealed by the casing during the forming process as the center.

* * * * *